United States Patent [19]

Suzuki et al.

[11] 4,342,837
[45] Aug. 3, 1982

[54] SINTERABLE SILICON CARBIDE POWDERS AND SINTERED BODY PRODUCED THEREFROM

[75] Inventors: Hiroshige Suzuki, No. 39-9, 2-Chome, Kitasenzoku, Ohta-Ku, Tokyo, Japan; Teizo Hase, Tokyo, Japan

[73] Assignee: Hiroshige Suzuki, Tokyo, Japan

[21] Appl. No.: 233,691

[22] Filed: Feb. 12, 1981

Related U.S. Application Data

[63] Continuation of Ser. No. 149,693, May 14, 1980, abandoned, which is a continuation of Ser. No. 17,200, Mar. 5, 1979, abandoned.

[30] Foreign Application Priority Data

Mar. 15, 1978 [JP] Japan .................................. 53-28599

[51] Int. Cl.$^3$ ............................................. C04B 35/56
[52] U.S. Cl. ..................................... 501/90; 423/345
[58] Field of Search ......................... 423/345; 106/44; 501/90, 91

[56] References Cited

U.S. PATENT DOCUMENTS 875,673  12/1907  Potter ................................ 423/345
3,271,109  9/1966  Mezey ............................... 423/345

FOREIGN PATENT DOCUMENTS 2123572  11/1972  Fed. Rep. of Germany ........ 106/44

OTHER PUBLICATIONS

Gulden, "J. of Amer. Ceram. Soc.", vol. 52, No. 11, 1969, pp. 585–590.

*Primary Examiner*—Jack Cooper
*Attorney, Agent, or Firm*—Stevens, Davis, Miller & Mosher

[57] ABSTRACT

Silicon carbide powders suitable for producing sintered body having a high density are produced by reacting 1.7 to 2.1 parts by weight of silicon monoxide with 1.0 part by weight of finely divided carbon at a temperature of 1,200° to 1,500° C. under a reduced pressure of lower than 10 mmHg.

2 Claims, No Drawings

SINTERABLE SILICON CARBIDE POWDERS AND SINTERED BODY PRODUCED THEREFROM

This is a continuation of application Ser. No. 149,693 filed May 14, 1980 which in turn is a continuation of 17,200 filed Mar. 5, 1979 both now abandoned.

The present invention relates to sintering silicon carbide powders and a process for producing said powders.

Since silicon carbide is excellent in the strength at high temperatures, thermal shock resistance, oxidation and corrosion resistance, it has been intended to use said material for parts of gas turbine, heat exchanger and the like as the best materials for saving energy, and to use said material for lining materials of ball mill, combustion tubes and parts of machines and tools for handling corrosive liquid and liquid metals.

In order to apply silicon carbide to the above described broad field, silicon carbide must be made into the desired shaped sintered bodies having high density. Heretofore, silicon carbide has been considered to be the material which is difficult in sintering but as disclosed in Japanese Patent Laid-Open Application No. 78,609/75 and No. 148,712/76, the given shaped sintered bodies having high density are produced by sintering under no pressure by adding the sintering accelerator, such as boron and carbon.

The production of silicon carbide powders forming the above described dense sintered bodies has been disclosed in Japanese Patent Laid-Open Application No. 160,200/75. According to this prior art, β-type silicon carbide powders are produced by the vapor phase reaction which is carried out in the specific apparatus, but in such a vapor phase reaction process, the starting material for sintering becomes comparatively expensive and is readily hydrolyzed in air and further the yield in the vapor phase reaction is not so high, so that this process is poor in the availability of silicon carbide powders and the production becomes expensive, so that this process is disadvantageous. Moreover, α-type silicon carbide powders described in the above described Japanese Patent Laid-Open Application No. 148,712/76 are produced by milling silicon carbide produced by the same process as the process by which silicon carbide is produced in a large amount as the polishing material and separating the finely divided powders having the given grain size and in this process there is substantially no problem in the availability of the starting material but other than the milling and separation, the operation for removing impurities which hinder the sintering ability, mixed in the production steps, is needed. For example, as described in a part of this prior art, acid (for example, hydrofluoric acid and/or nitric acid, particularly a mixture of hydrofluoric acid and nitric acid) treatment is necessary and this process is disadvantageous in view of operation conditions and public nuisance.

Therefore, the present invention has made in order to obivate the above described problems and can easily produce silicon carbide powders having submicron grain size, which can be sintered as silicon carbide body of substantially single phase having a density of more than 93% of the theoretical density by using the sintering aids (boron and carbon).

The production process of the present invention can be shown by the following reaction formula

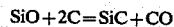

and consists in that silicon monoxide (SiO) is reacted with finely divided carbon, such as carbon black produced by pyrolysis or carbonization reaction of a hydrocarbon vapor or an organic compound, at a temperature of 1,200° to 1,500° C. under a reduced pressure of lower than 10 mmHg. Silicon monoxide also may be produced by reacting metallic silicon (Si) with silica (SiO$_2$) in the substantially equimolar amount.

Sintering silicon carbide powders having submicron grain size must prevent oxidation of the particle surface as far as possible, so that the atmosphere in the furnace upon the reaction is substituted with an inert gas and the partial pressure of oxygen in the furnace must be lowered to $10^{-10} \sim 10^{-14}$ atm.

As the practical embodiment, a mixture of 1 part by weight of carbon black and 1.7 to 2.1 parts by weight of commercially available silicon monoxide is heated under the above described condition. Alternatively, metallic silicon is reacted with silica by the following formula in one reaction chamber to form gaseous SiO.

This gaseous SiO is forcedly introduced into the other reaction chamber where carbon black has been charged and both the substances are reacted under the above described condition. Alternatively, the formed gaseous SiO is reacted with finely divided carbon formed, for example, by pyrolysis of methane gas to prepare sintering silicon carbide powders.

The preferred mixture range of SiO is 1.8 to 2.0 parts by weight and when the amount of SiO is less than 1.7 parts by weight, an amount of free carbon residue increases, while when said amount exceeds 2.1 parts by weight, the volatilized SiO increases, so that such an amount is not economic. The reaction temperature is 1,200° to 1,500° C. but the optimum reaction temperature is 1,340° to 1,440° C. If the resulting powders heated until the gas formation is completed, are directly mixed with less than 1% by weight of each of boron and carbon, which are the well known additives, the mixture can be converted into the sintered body having 96% of theoretical density by heating at 2,100° C. for 60 minutes under atmospheric pressure or subatmospheric pressure. Under these conditions, a sintered body containing more than 90% of β-type silicon carbide can be achieved. At the temperature side lower than the optimum temperature range, the reaction time becomes longer or unreacted products may be mixed, while at the higher temperature side, the formed particles become coarse.

In the above described Japanese Patent Laid-Open Application No. 78,609/75, there is described in Example that in the formed sintered body, the coarse plate-shaped particles of 200 μm are often formed in the texture of the sintered body. Of course, the mechanical strength of the sintered body becomes higher, as the sintered body has the more fine particle structure, so that it is necessary to restrain the growth of the coarse particles as far as possible. It has been known that the coarse particles are α-type (6H) silicon carbide formed following to transition of β-type silicon carbide into α-type silicon carbide and the process in which nitrogen gas which shows the effect for controlling the transition, is introduced into the sintering atmosphere to control the sintered body texture, is considered but it must be more preferable to select silicon carbide powders in which the transition velocity is more slow than the densification velocity, as the sintering material. The sintered body of silicon carbide powders made by the process of the present invention is low in the rate of transition into α-type silicon carbide and has the fine particle structure of less than 10 μm. The sintered body according to the present invention has a large three point bending strength of 82.0 kg/mm$^2$ at 1,700° C. under vacuum (about 10$^{-5}$ mmHg).

The following examples are given for the purpose of illustration of this invention and are not intended as limitations thereof.

EXAMPLE 1

One part by weight of carbon black (specific surface area: 115 m$^2$/g) and 2.0 parts by weight of commercially available SiO (made by Merck Co., less than 0.04 mm class) were mixed in polyethylene container by using teflon balls by adding benzene. The dried powders after mixing were charged in a graphite crucible, which was put in a vacuum furnace. The pressure in the furnace was reduced to about 10$^{-3}$ mmHg and then He gas was introduced into the furnace and the pressure was made to be 1 atm. and then finally reduced to 10$^{-4}$ ~ 10$^{-5}$ mmHg and the temperature was finally raised to 1,000° C. Thereafter, the temperature was raised finally to 1,440° C. by a temperature raising rate of about 5° C./min. while keeping the furnace under a reduced pressure only by a hydraulic rotary pump and the heating was continued until the generation of the gas was completed. The formed finely divided silicon carbide powders were mainly β-type and the specific surface area was 11 m$^2$/g.

EXAMPLE 2

2.2 parts by weight of mixture of 0.7 part by weight of metal silicon (purity: 99%, mean grain size: about 10 μm) and 1.5 parts by weight of SiO$_2$ was put on a lower portion of a vertical type graphite tube, the lower end of which is sealed and this mixture was separated by a porous carbon plate (barrier) and 1.4 parts by weight of carbon black (115 m$^2$/g) was mounted on the carbon plate. The thus arranged graphite tube was put in a reaction furnace in a vertical state and air in the furnace was exhausted out and then substituted with He gas. The pressure in the furnace was again reduced to about 10$^{-5}$ mmHg and then the temperature was raised. During reaction, the exhaustion was mainly effected from the upper portion of the graphite tube and SiO gas generated at the lower portion of the graphite tube was introduced into the carbon black layer. The temperature was maintained at 1,400° to 1,440° C. at the graphite tube reactor. The carbon black in the reactor reacts with SiO while being disturbed by carbon monoxide gas generated by the reaction. When the generation of the gas was completed, the electric source of the furnace was put off. The prepared silicon carbide fine powders were mainly β-type and the specific surface area was 15 m$^2$/g.

EXAMPLE 3

98% by weight of silicon carbide fine powders prepared in Example 1, which is directly used, 1% by weight of non-crystal boron powders and 1% by weight of carbon black were mixed in polyethylene container by using teflon balls by adding acetone. After mixing, to the dried powders was added about 10% of n-dibutyl phthalate as a molding aid and the mixture was molded under hydraulic pressure. The density of the pressed green body was about 50% of the theoretical density.

The pressed green body was heated under helium of 1 atm. of lower than 1 ppm of oxygen and less than 12 ppm of water to 2,100° C. by a temperature raising rate of 5.5° C./min. It has been found from the powdery X-ray diffraction that the crystal structure of silicon carbide in the sintered body is β-type and α-type (6H), so that the quantitative analysis of the crystal structure was carried out by Kawamura's process (Mineralogical Journal, Vol. 4, No. 5 (1965), p. 333).

The time keeping at 2,100° C., the ratio of β-type in the sintered body and the density are shown in the following Table.

TABLE

| Time (min.) | Ratio of β-type SiC (%) | Relative density (%) |
|---|---|---|
| 0 | 100 | 92 |
| 20 | 98 | 95 |
| 60 | 93 | 96 |

As the time passes, β-type decreases (α-type (6H) silicon carbide present as the coarse particles increases) but the amount is very small and the texture consists mainly of fine particle structure of less than 10 μm. The sintered body had the bending strength of 82.0 kg/mm$^2$ at the three point bending test at 1,700° C. and 10$^{-6}$ mmHg.

COMPARATIVE EXAMPLE 1

One part by weight of metal silicon (purity: 99.9%, grain diameter: 2 to 5 μm) and 0.43 part by weight of carbon black (specific surface area: 115 m$^2$/g) were mixed by using a plastic ball mill by adding benzene for 2 days. After the mixture was dried, the mixture was reacted at 1,380° C. under vacuum of about 10$^{-6}$ mmHg. The formed silicon carbide powders were treated with a mixed acid of hydrofluoric acid and nitric acid in the equal amount. To the thus treated powders were mixed and uniformly dispersed 1% by weight of non-crystal boron powders and 1% by weight of carbon black. The obtained powders were molded under hydraulic pressure and sintered at 2,150° C. under 1 atm. of pure helium for 60 minutes and the sintered body had a density of about 89%. The texture of the sintered body consisted mainly of coarse plate-shaped particles having a width of about 30 μm and a length of about 100 to 200 μm. Even if the sintered body was heated at a temperature higher than 2,150° C., the density did not substantially increase. The ratio of β-type silicon carbide in the sintered body was only 10%.

COMPARATIVE EXAMPLE 2

One part by weight of colloidal silica dispersed in water and 0.6 part by weight of carbon black (specific surface area: 115 m$^2$/g) were mixed in a plastic ball mill by a wet process using water for 2 days. The dried mixture was heated up to 1,100° C. under a pressure of about 10$^{-4}$ mmHg and then kept at 1,440° C. while exhausting the generated gas by a hydraulic rotary pump and heated until the generation of gas was completed. After the reaction, the powders were oxidized in air to remove unreacted carbon and then silicon dioxide was removed with hydrofluoric acid treatment. To the thus obtained silicon carbide powders were added 1% by weight of boron and 1% by weight of carbon. The resulting mixture was molded under hydraulic pressure and the pressed green body was sintered at 2,100° C. under 1 atm. of pure helium for 60 minutes. The density of the sintered body was 94% of the theoretical density but the texture of the sintered body consisted mainly of coarse grains of a width of about 50 μm and a length of about 200 to 300 μm. The ratio of β-type silicon carbide in the sintered body was only 6%.

What is claimed is:

1. Sinterable silicon carbide powders having submicron grain size produced by reacting 1.8 to 2.0 parts by weight of silicon monoxide with to 1.0 part by weight of finely divided carbon at a temperature of 1,340° to 1,440° C. under an essentially inert atmosphere at a reduced pressure of less than 10 mmHg, the partial pressure of oxygen in said atmosphere being less than $10^{-10}$ atmospheres, said powders when mixed with 1% by weight each of boron and carbon and then heated at 2,100° C. for 60 minutes forming a sintered body having a density of 96% of theoretical density, a fine particle structure of less than 10 μm, a bending strength of 82.0 kg/mm$^2$ in the three point bending test at 1700° C. at $10^{-6}$ mmHg and containing more than 90%-β-type silicon carbide.

2. A sintered body produced by mixing the sinterable silicon carbide powders of claim 1 with 1% by weight each of boron and carbon, and heating said mixture at 2,100° C. for 60 minutes said sintered body having a density of 96% of theoretical density, a fine particle structure of less than 10 μm, a bending strength of 82.0 kg/mm$^2$ in the three point bending test at 1700° C. at $10^{-6}$ mmHg and containing more than 90% of β-type silicon carbide.

* * * * *